(12) United States Patent
Jenkins

(10) Patent No.: US 8,857,373 B2
(45) Date of Patent: Oct. 14, 2014

(54) APPARATUS FOR GRAVITY FED ANIMAL FEEDER

(76) Inventor: Bryan Jenkins, Cumming, GA (US)

(*) Notice: Subject to any disclaimer, the term of this patent is extended or adjusted under 35 U.S.C. 154(b) by 235 days.

(21) Appl. No.: 13/608,005

(22) Filed: Sep. 10, 2012

(65) Prior Publication Data

US 2013/0061809 A1  Mar. 14, 2013

Related U.S. Application Data

(60) Provisional application No. 61/532,489, filed on Sep. 8, 2011.

(51) Int. Cl.
*A01K 39/00* (2006.01)

(52) U.S. Cl.
USPC ............................................. 119/52.1; 119/68

(58) Field of Classification Search
USPC ................ 119/52.1, 61.57, 68, 69, 57.8, 57.9
See application file for complete search history.

(56) References Cited

U.S. PATENT DOCUMENTS

| | | | | |
|---|---|---|---|---|
| 6,363,887 B1* | 4/2002 | Davis | | 119/52.1 |
| 6,532,894 B2* | 3/2003 | Johnson | | 119/52.3 |
| 6,584,932 B2* | 7/2003 | Rogers et al. | | 119/57.9 |
| 7,392,763 B2* | 7/2008 | Willinger et al. | | 119/464 |
| 8,316,800 B2* | 11/2012 | Puckett et al. | | 119/57.8 |
| 2003/0062000 A1* | 4/2003 | Rogers et al. | | 119/57.9 |
| 2003/0150391 A1* | 8/2003 | Rich | | 119/57.8 |
| 2011/0107973 A1* | 5/2011 | Jenkins | | 119/52.1 |

* cited by examiner

*Primary Examiner* — Yvonne Abbott

(57) ABSTRACT

An apparatus for gravity fed animal feeder forms from a mold that combines a storage compartment that protects feed. The feed is entered into the storage compartment through a top opening. The storage compartment is connected with a food trough that allows feed to refill once the feed is removed. An upper attachment and a lower attachment attach the storage compartment with existing tree of pole. An upper mounting bracket in the upper attachment is larger than a lower mounting bracket in the lower attachment allowing the feed to easily flow towards a side opening of the storage compartment. Attaching straps are connected to the upper mounting bracket and to the lower mounting bracket by strap connecters. A lid is attached around the top opening and secured to the storage compartment by a locking mechanism. The apparatus can be placed at ground level or at an elevated level.

16 Claims, 8 Drawing Sheets

APPARATUS FOR GRAVITY FED ANIMAL FEEDER

The current application claims a priority to the U.S. Provisional Patent application Ser. No. 61/532,489 filed on Sep. 8, 2011. The current application is filed on Sep. 10, 2012 while Sep. 8, 2012 was on a weekend.

FIELD OF THE INVENTION

The present invention relates generally to an apparatus for a feeder. More specifically, the apparatus is a gravity-fed animal feeder.

BACKGROUND OF THE INVENTION

Outdoor animal feeders give animals easy access to nutrients in the form of feed, seed, corn, or any other desired food source. Typical feeders often have to be refilled, causing an inconvenience for anyone tasked with keeping the animals fed. Gravity fed feeders allow for the storage of food above an eating trough. In gravity fed feeders, however, feed often gets stuck in the feeder and can go to waste. Additionally, eating troughs can fill with water, which can make the food inside the storage area wet.

It is therefore an object of the present invention to provide an outdoor animal feeder that is mounted at an angle so that all of the feed exits to the trough of the feeder. It is a further object of the present invention to provide for a way to draining water from the trough. The present invention is large enough to store a large volume of food and is sturdy and durable. The present invention suspends the feed off the ground, which keeps the feed clean and away from feces while animals feed and defecate. The present invention therefore prevents bacteria from animals contaminating the feed.

DETAIL DESCRIPTIONS OF THE INVENTION

All illustrations of the drawings are for the purpose of describing selected versions of the present invention and are not intended to limit the scope of the present invention.

Figure 5:
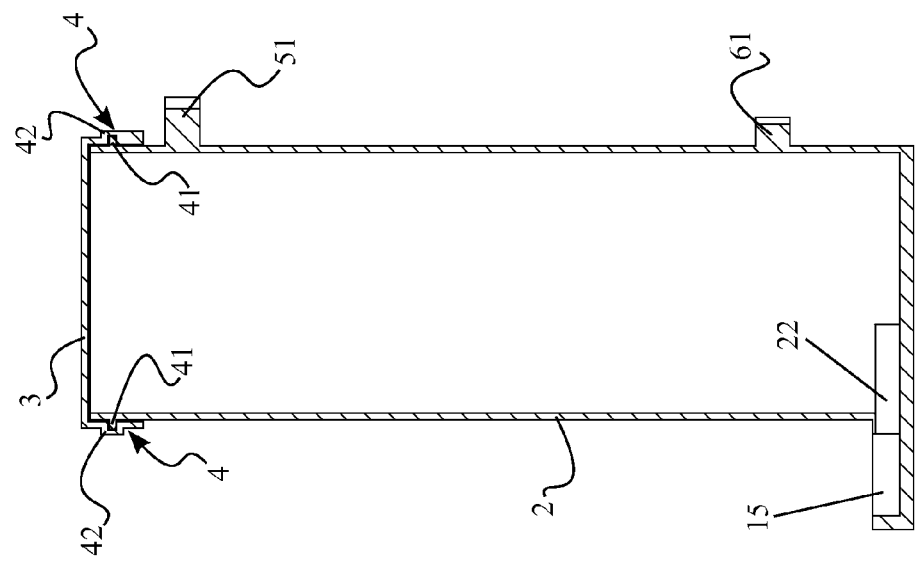
FIG. 5 is a cross section view of the FIG. 4.
Figure 8:
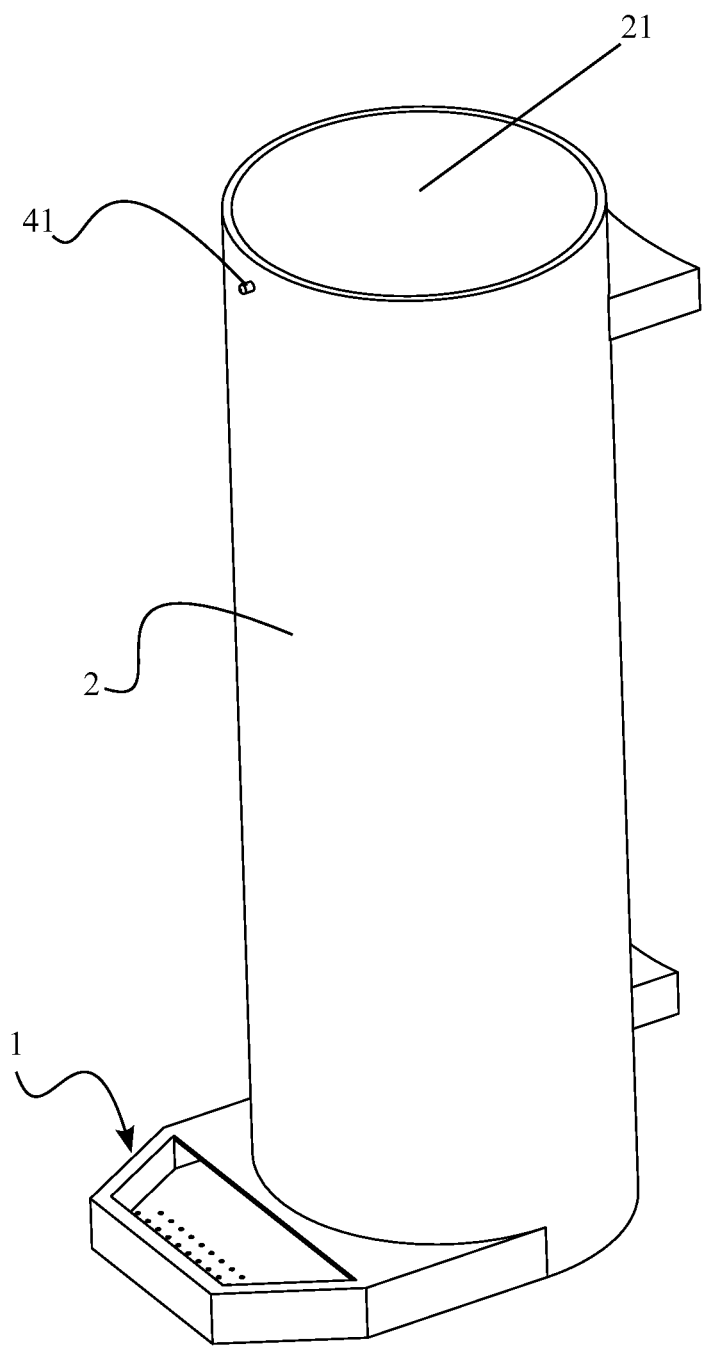
FIG. 8 is a perspective view of the present invention without the attachment straps, strap connecters, and the lid and illustrating a top opening.

The present invention is an apparatus for a gravity fed animal feeder which comprises a storage compartment 2, a food trough 1, a lid 3, a locking mechanism 4, an upper attachment 5, and a lower attachment 6. In reference to FIG. 5 and FIG. 8, the storage compartment 2 comprises a top opening 21 and a side opening 22. The storage compartment 2 stores a supply of feed or any other desired material including, but not limited to, seed, corn or processed pet food. The storage compartment 2 can contain a large quantity of the supply of feed so that the present invention does not have to be refilled regularly. In the preferred embodiment, the storage compartment 2 comprises a cylindrical shape, but the storage compartment 2 in the present invention can be built into any suitable geometric shape and not only limited to the cylindrical shape. The top opening 21 is concentrically positioned with the storage compartment 2 and extends from a top end of the storage compartment 2 to a bottom end of the storage compartment 2. The side opening 22 is positioned on a cylindrical surface of the storage compartment 2 and adjacently positioned with the bottom end. The side opening 22 perpendicularly extends into the top opening 21 through the cylindrical surface.

Figure 1:
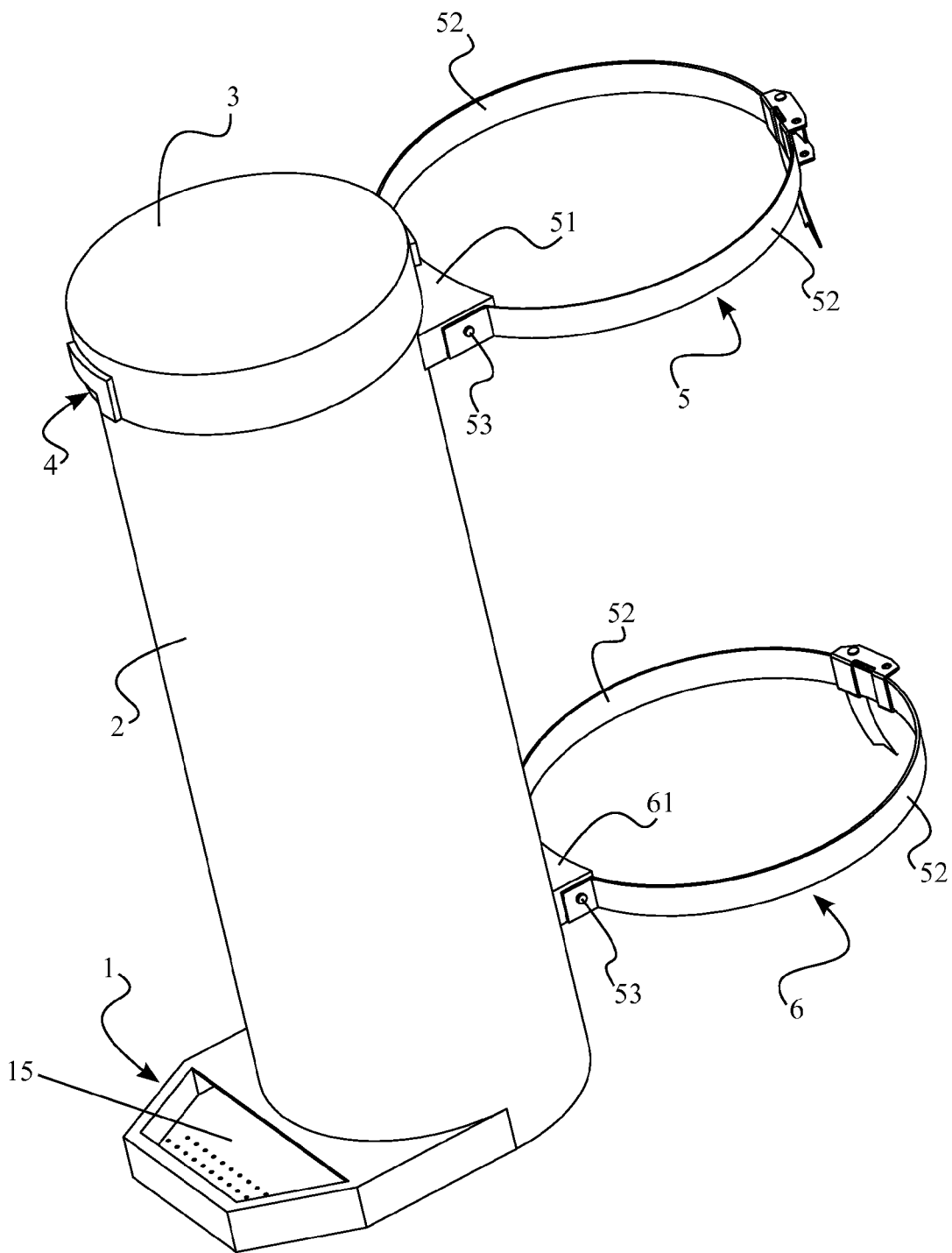
FIG. 1 is a perspective view of the present invention.
Figure 2:
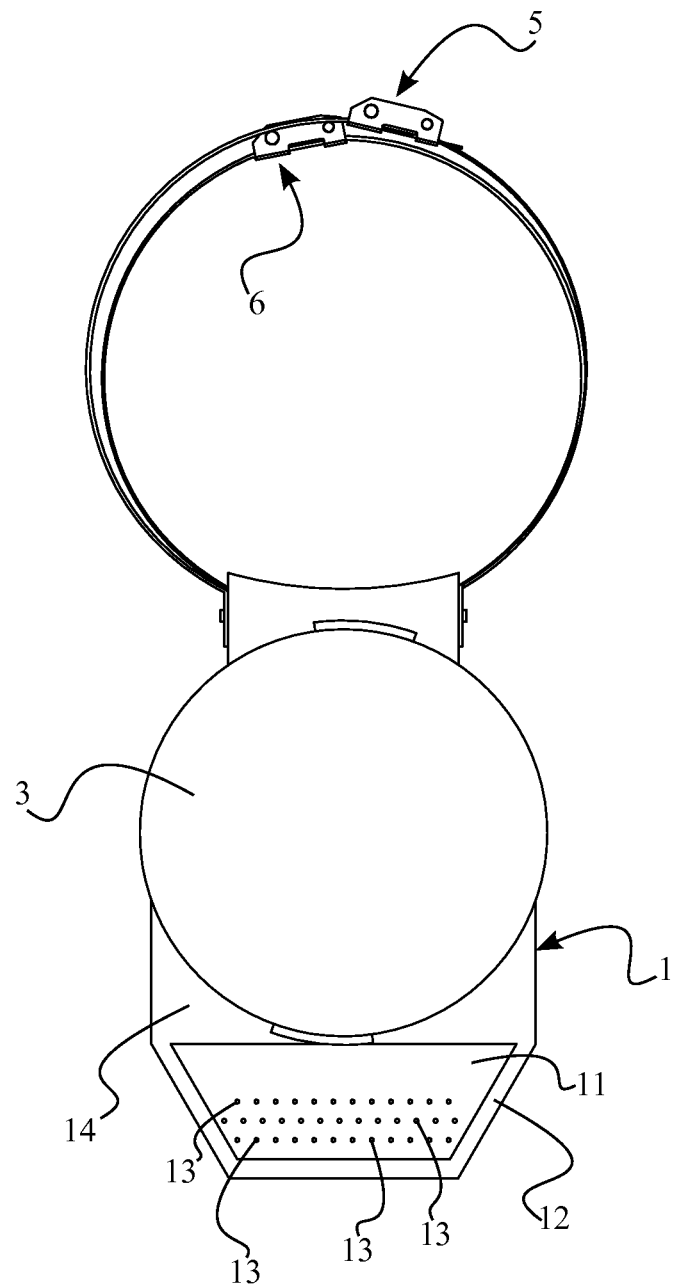
FIG. 2 is a top view of the present invention.

In reference to FIG. 1 and FIG. 2, the food trough 1 is adjacently positioned around the side opening 22 where the food trough 1 comprises a bottom panel 11, a trough wall 12, a plurality of seepage holes 13, a baffle lip 14, and a feeder opening 15. The bottom panel 11 extends out from the bottom end of the storage compartment 2 and positioned below the side opening 22. The trough wall 12 is perimetrically positioned around the bottom panel 11 and connected to the cylindrical surface. The connection between the bottom panel 11 and the trough wall 12 around the side opening 22 creates a platform so that the supply of feed can securely flow out from the storage compartment 2. When the supply of feed escapes through the side opening 22, the supply of feed is contained by the bottom panel 11 and the trough wall 12. The baffle lip 14 is connected to the cylindrical surface and the top edge of the trough wall 12 where the baffle lip 14 partially closes the platform. The baffle lip 14 controls the flow of the supply of feed as the supply of feed enters into the food trough 1. The feeder opening 15 is positioned in between the baffle lip 14 and the trough wall 12. The animals can access the supply of feed through the feeder opening 15. Once the supply of feed is removed from the food trough 1, the gravity allows the supply of feed to constantly refill the food trough 1. Since the food trough 1 is opened to the surrounding environment through the feeder opening 15, rain water can be accumulated in the food trough 1 in the event of rain. The plurality of seepage holes 13 is traversed through the bottom panel 11 so that the accumulated rain water can be drained from the food trough 1. The plurality of seepage holes 13 also keeps the supply of feed dry as the plurality of seepage holes 13 prevents the water from entering into the storage compartment 2. The plurality of seepage holes 13 comprises a very small diameter so that the supply of feed does not exit through the plurality of seepage holes 13. The food trough 1 can hold heavy weights of the supply of feed without separating from the storage compartment 2 because the storage compartment 2 provides firm components connections between the bottom panel 11, trough wall 12, and the baffle lip 14.

Figure 4:
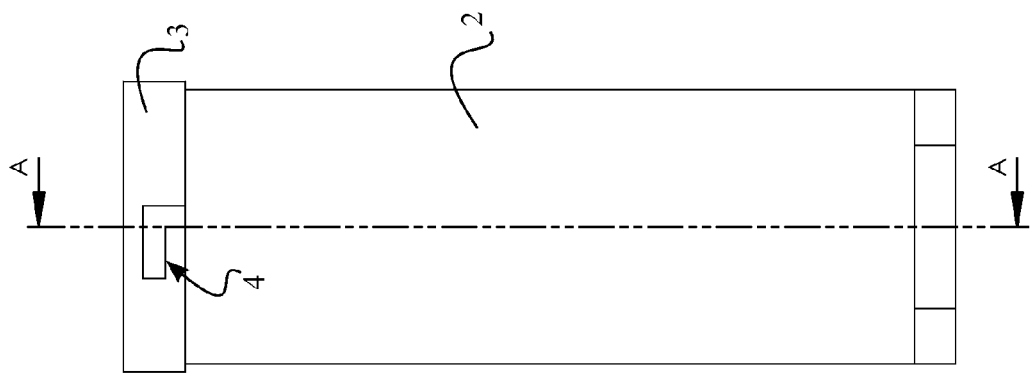
FIG. 4 is front view of the present invention.
Figure 6:
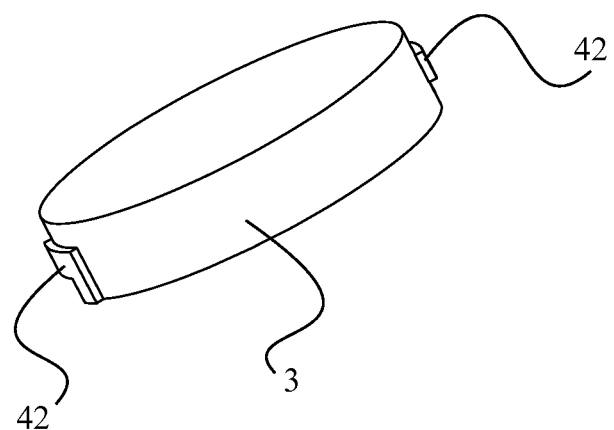
FIG. 6 is a top perspective view of a lid of the present invention.

In reference to FIG. 4 and FIG. 6, the lid 3 is positioned around the top opening 21 where the lid 3 completely covers the top opening 21 from the surrounding. Once the supply of feed is placed within the storage compartment 2, the lid 3 keeps the supply of feed dry and clean. The lid 3 comprises a similar shape as the storage compartment 2 so that the lid 3 can provide secure attachment to the storage compartment 2. In the preferred embodiment, the lid 3 is shaped into a cylindrical cap so that the lid 3 complements the cylindrical shape of the storage compartment 2. The lid 3 can be placed on top of the top opening 21 and secured to the storage compartment 2 by the locking mechanism 4.

Figure 7:
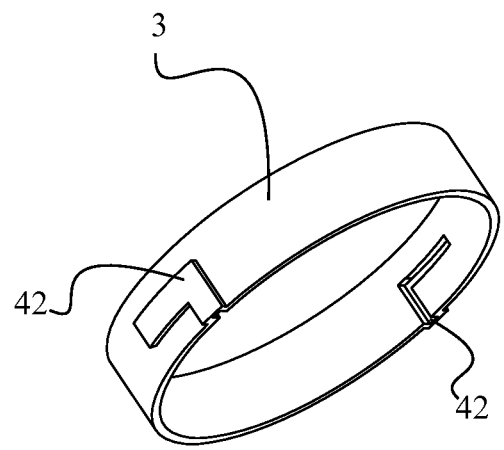
FIG. 7 is a bottom perspective view of the lid of the present invention.
Figure 9:
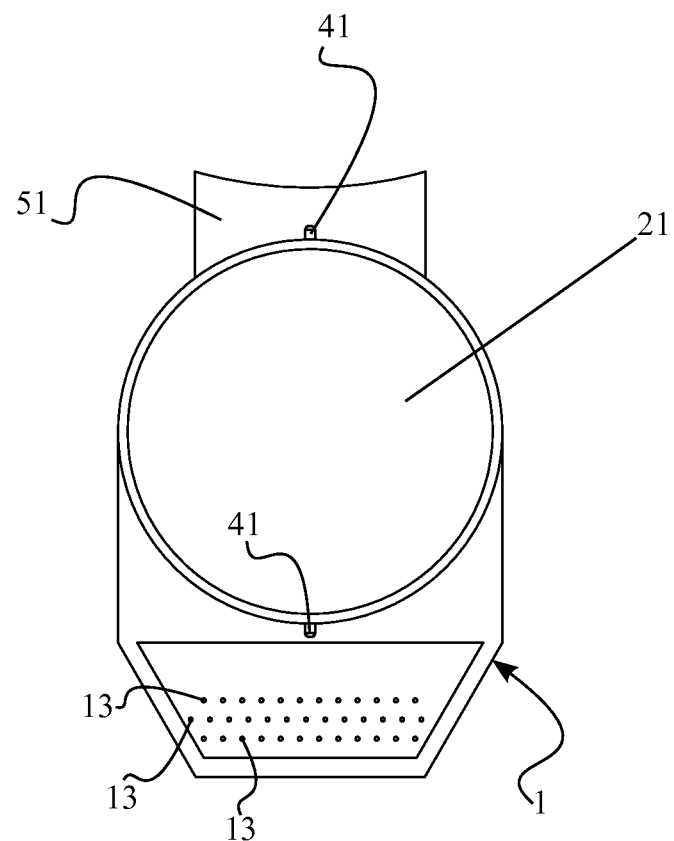
FIG. 9 is top view of the present invention without the attachment straps, strap connecters, and the lid.

The locking mechanism 4 in the present invention can be a snap fit locking system, a mechanical locking system, a pin locking system, a twist locking system, or any other type of locking system as long as the lid 3 completely secures with the storage compartment 2. In the preferred embodiment, a twist locking system is implemented between the storage compartment 2 and the lid 3 to achieve simplicity within the present invention. The twist locking system comprises a plurality of tabs 41 and a plurality of locking railings 42. In reference to FIG. 9, the plurality of tabs 41 is equally spaced and radially connected to the cylindrical surface of the storage compartment 2 from the top end. In reference to FIG. 7, the plurality of locking railings 42 is also equally spaced and radially connected to the lid 3. Each of the plurality of locking railings 42 comprises L-shaped extrusion where each of the L-shaped extrusions positions around each of the plurality of tabs 41 when the lid 3 is secured with the storage compartment 2. In order to close the top opening 21 by the lid 3, the lid 3 needs to be placed on top of the top opening 21 where each of the plurality of locking railings 42 aligns with each of the plurality of tabs 41. Then the lid 3 is inserted around the storage compartment 2 where each of the plurality of tabs 41 engages with each of the plurality of locking railings 42. Then the lid 3 is twisted so that the lid 3 can be locked with the storage compartment 2 as the plurality of tabs 41 travels through the plurality of locking railings 42.

Figure 3:
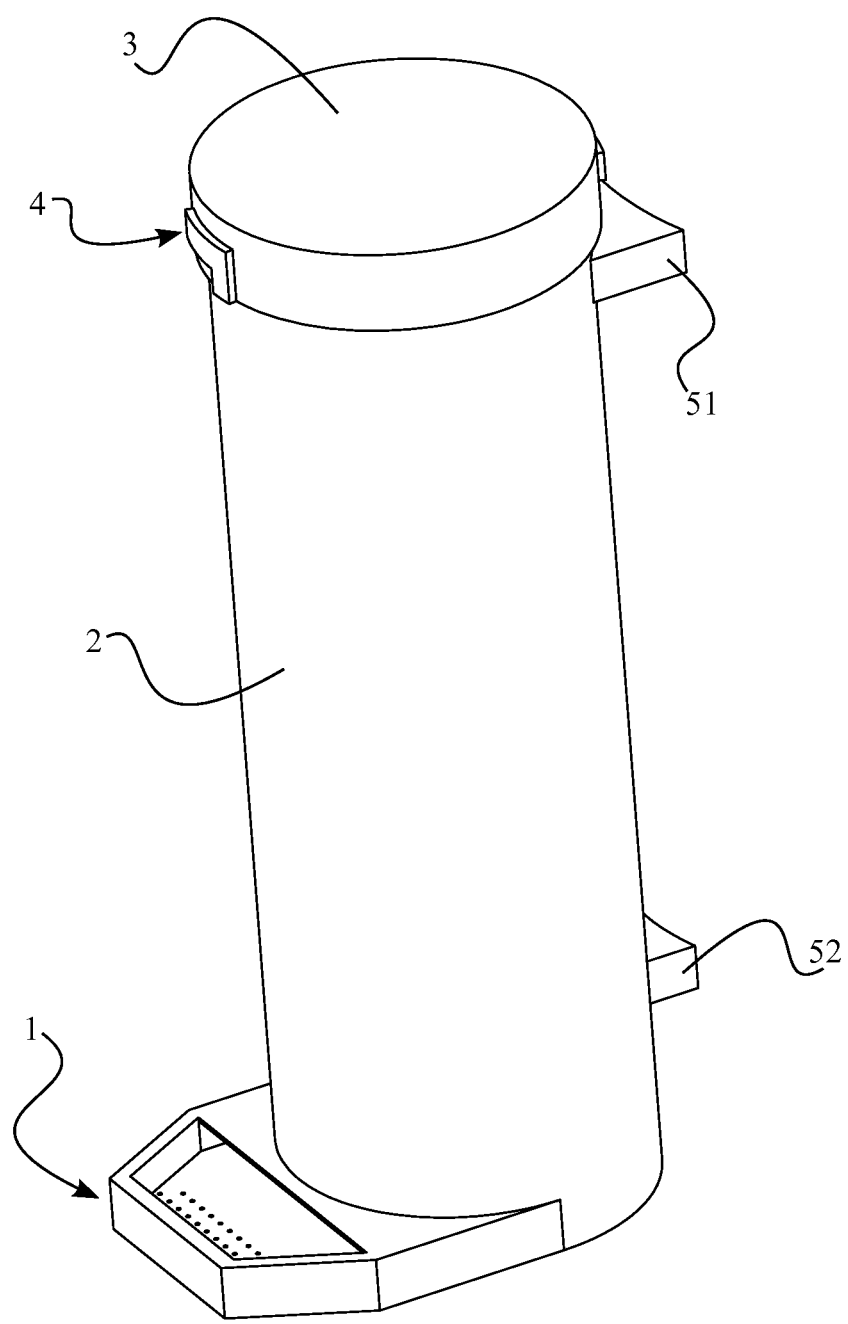
FIG. 3 is a perspective view of the present invention without attachment straps and strap connecters.

The present invention attaches to a stationary pole or tree by a plurality of attachments. In the preferred embodiment, the plurality of attachments comprises the upper attachment 5 and the lower attachment 6. Multiple numbers of attachments can be used within the present invention for added strength. In reference to FIG. 1, the upper attachment 5 and the lower attachment 6 are vertically positioned behind the food trough 1. The upper attachment 5 comprises an upper mounting bracket 51, attachment straps 52, and strap connecters 53. The lower attachment 6 comprises a lower mounting bracket 61, the attachment straps 52, and the strap connecters 53. In reference to FIG. 3 and FIG. 5, the upper mounting bracket 51 is adjacently positioned below the lid 3 and perpendicularly connected to the storage compartment 2 through the cylindrical surface. The lower mounting bracket 61 is vertically positioned below the upper mounting bracket 51 and perpendicularly connected to the storage compartment 2 through the cylindrical surface. The attachment straps 52 in the upper attachment 5 and the lower attachment 6 are respectively connected to the upper mounting bracket 51 and the lower mounting bracket 61 by the strap connecters 53 where the strap connecters 53 can be a system of nuts and bolts, a plurality of screws, or any other type of connecting systems. The attachment straps 52 attach the present invention around the stationary pole or tree. The attachment straps 52 may also be pre-connected with the upper mounting bracket 51 and the lower mounting bracket 61. In the preferred embodiment, ratchet straps are used as the attachment straps 52. The upper mounting bracket 51 is also longer than the lower mounting bracket 61 so that the present invention tilts slightly downward to a desired forward lean while still being secured in place, allowing the supply of feed to flow towards the side opening 22 of the storage compartment 2. The desired forward lean can be achieved by adjusting the upper attachment 5 and the lower attachment 6. The angle of the storage compartment 2, the direction of the supply of feed, and the flow speed of the supply of feed can be controlled the desired forward lean of the present invention.

The present invention may be placed either at ground level or at an elevated level. The upper attachment 5 and the lower attachment 6 keep the storage compartment 2 strapped to any fixed objects. In the preferred embodiment of the present invention, the storage compartment 2, the lid 3, and the food trough 1 are made from composite and lightweight materials.

In the preferred embodiment of the present invention, the present invention can be used for exterior feeding of animals or interior feeding of animals. In alternative embodiments of the present invention, the present invention may be used in a stable or placed under a shelter.

Although the invention has been explained in relation to its preferred embodiment, it is to be understood that many other possible modifications and variations can be made without departing from the spirit and scope of the invention as hereinafter claimed.

What is claimed is:

1. An apparatus for a gravity fed animal feeder comprises,
   a storage compartment;
   a food trough;
   a lid;
   a locking mechanism;
   an upper attachment;
   a lower attachment;
   the storage compartment comprises a top opening and a side opening;
   the food trough being adjacently positioned with the side opening;
   the locking mechanism comprises a plurality of tabs and a plurality of locking railings;
   the locking mechanism being jointly positioned with the top opening and the lid;
   the upper attachment and the lower attachment being positioned along the storage compartment;
   the lid being positioned atop the top opening;
   the plurality of tabs being equally spaced around the storage compartment;
   the plurality of tabs being radially connected to the storage compartment;
   the plurality of locking railings being equally spaced around the lid;
   the plurality of locking railings being radially connected to the lid; and
   the lid being removably attached to the storage compartment by the plurality of locking railings and the plurality of tabs.

2. The apparatus for a gravity fed animal feeder as claimed in claim 1 comprises,
   the top opening being centrally positioned within the storage compartment; and
   the side opening being perpendicularly positioned with the top opening.

3. The apparatus for a gravity fed animal feeder as claimed in claim 1 comprises,
   the food trough comprises a bottom panel, a trough wall, a plurality of seepage holes, a baffle lip, and a feeder opening;
   the bottom panel being connected below the side opening;
   the plurality of seepage holes being traversed through the bottom panel;
   the trough wall being perimetrically positioned around the bottom panel;
   the baffle lip being positioned atop the trough wall and connected to the storage compartment; and
   the feeder opening being positioned in between the baffle lip and the trough wall.

4. The apparatus for a gravity fed animal feeder as claimed in claim 1 comprises,
   the upper attachment comprises an upper mounting bracket, attaching straps, and strap connectors;
   the upper mounting bracket being adjacently positioned below the lid and oppositely positioned from the food trough;

the upper mounting bracket being perpendicularly connected to the storage compartment; and the attaching straps being attached to the upper mounting bracket by the strap connectors.

5. The apparatus for a gravity fed animal feeder as claimed in claim 1 comprises, the lower attachment comprises an lower mounting bracket, attaching straps, and strap connectors;

the lower mounting bracket being vertically positioned below the upper attachment;

the lower mounting bracket being perpendicularly connected to the storage compartment; and the attaching straps being attached to the lower mounting bracket by the strap connectors.

6. An apparatus for a gravity fed animal feeder comprises, a storage compartment;

a food trough;

a lid;

a locking mechanism;

an upper attachment;

a lower attachment;

the storage compartment comprises a top opening and a side opening;

the food trough comprises a bottom panel, a trough wall, a plurality of seepage holes, a baffle lip, and a feeder opening;

the locking mechanism comprises a plurality of tabs and a plurality of locking railings;

the upper attachment comprises an upper mounting bracket, attaching straps, and strap connectors;

the lower attachment comprises an lower mounting bracket, the attaching straps, and the strap connectors;

the food trough being adjacently positioned with the side opening;

the locking mechanism being jointly positioned with the top opening and the lid; and the upper attachment and the lower attachment being positioned along the storage compartment.

7. The apparatus for a gravity fed animal feeder as claimed in claim 6 comprises, the top opening being centrally positioned within the storage compartment;

the side opening being perpendicularly positioned with the top opening;

the side opening being extended into the top opening through the storage compartment; and the top opening being extended up to the side opening.

8. The apparatus for a gravity fed animal feeder as claimed in claim 6 comprises, the bottom panel being connected below the side opening;

the plurality of seepage holes being traversed through the bottom panel;

the trough wall being perimetrically positioned around the bottom panel;

the baffle lip being positioned atop the trough wall and connected to the storage compartment; and the feeder opening being positioned in between the baffle lip and the trough wall.

9. The apparatus for a gravity fed animal feeder as claimed in claim 6 comprises, the lid being positioned atop the top opening;

the plurality of tabs being equally spaced around the storage compartment;

the plurality of tabs being radially connected to the storage compartment;

the plurality of locking railings being equally spaced around the lid;

the plurality of locking railings being radially connected to the lid; and the lid being removably attached to the storage compartment by the plurality of locking railings and the plurality of tabs.

10. The apparatus for a gravity fed animal feeder as claimed in claim 6 comprises, the upper mounting bracket being adjacently positioned below the lid and oppositely positioned from the food trough;

the upper mounting bracket being perpendicularly connected to the storage compartment; and the attaching straps being attached to the upper mounting bracket by the strap connectors.

11. The apparatus for a gravity fed animal feeder as claimed in claim 6 comprises, the lower mounting bracket being vertically positioned below the upper attachment;

the lower mounting bracket being perpendicularly connected to the storage compartment; and the attaching straps being attached to the lower mounting bracket by the strap connectors.

12. An apparatus for a gravity fed animal feeder comprises, a storage compartment;

a food trough;

a lid;

a locking mechanism;

an upper attachment;

a lower attachment;

the storage compartment comprises a top opening and a side opening;

the food trough comprises a bottom panel, a trough wall, a plurality of seepage holes, a baffle lip, and a feeder opening;

the locking mechanism comprises a plurality of tabs and a plurality of locking railings;

the upper attachment comprises an upper mounting bracket, attaching straps, and strap connectors;

the lower attachment comprises an lower mounting bracket, the attaching straps, and the strap connectors;

the food trough being adjacently positioned with the side opening;

the locking mechanism being jointly positioned with the top opening and the lid; and the upper attachment and the lower attachment being positioned along the storage compartment.

13. The apparatus for a gravity fed animal feeder as claimed in claim 12 comprises, the top opening being centrally positioned within the storage compartment;

the side opening being perpendicularly positioned with the top opening;

the side opening being extended into the top opening through the storage compartment; and the top opening being extended up to the side opening.

14. The apparatus for a gravity fed animal feeder as claimed in claim 12 comprises, the bottom panel being connected below the side opening;

the plurality of seepage holes being traversed through the bottom panel;

the trough wall being perimetrically positioned around the bottom panel;

the baffle lip being positioned atop the trough wall and connected to the storage compartment; and the feeder opening being positioned in between the baffle lip and the trough wall.

15. The apparatus for a gravity fed animal feeder as claimed in claim 12 comprises, the lid being positioned atop the top opening;

the plurality of tabs being equally spaced around the storage compartment;

the plurality of tabs being radially connected to the storage compartment;

the plurality of locking railings being equally spaced around the lid;

the plurality of locking railings being radially connected to the lid; and the lid being removably attached to the storage compartment by the plurality of locking railings and the plurality of tabs.

16. The apparatus for a gravity fed animal feeder as claimed in claim 12 comprises, the upper mounting bracket being adjacently positioned below the lid and oppositely positioned from the food trough;

the upper mounting bracket being perpendicularly connected to the storage compartment;

the attaching straps being attached to the upper mounting bracket by the strap connectors;

the lower mounting bracket being vertically positioned below the upper mounting bracket;

the lower mounting bracket being perpendicularly connected to the storage compartment; and the attaching straps being attached to the lower mounting bracket by the strap connectors.

\* \* \* \* \*